United States Patent [19]

Aoki

[11] Patent Number: 4,868,709
[45] Date of Patent: Sep. 19, 1989

[54] ELECTROMAGNETIC DRIVE CIRCUIT

[75] Inventor: Hiroshi Aoki, Tokyo, Japan

[73] Assignee: Seikosha Co., Ltd., Japan

[21] Appl. No.: 164,428

[22] Filed: Mar. 4, 1988

[30] Foreign Application Priority Data

Mar. 6, 1987 [JP] Japan ................................. 62-51262

[51] Int. Cl.$^4$ ....................... H01H 47/12; G04C 3/02
[52] U.S. Cl. .................................. 361/203; 368/166;
368/181; 361/159
[58] Field of Search ...................... 368/165, 166, 181;
84/484; 361/159, 203, 147

[56] References Cited

U.S. PATENT DOCUMENTS 4,196,579 4/1980 Schaefer .............................. 368/165

FOREIGN PATENT DOCUMENTS 3126237 1/1983 Fed. Rep. of Germany ...... 368/166

*Primary Examiner*—E. T. Hix
*Assistant Examiner*—David M. Gray
*Attorney, Agent, or Firm*—Bruce L. Adams; Van C. Wilks

[57] ABSTRACT

An electromagnetic drive circuit comprises a coil for detecting and driving a permanent magnet; a comparator for generating an output when the induced voltage of the coil exceeds a reference voltage; a pulse generator for generating a drive pulse train in response to generation of the output of the comparator; a driver responsive to the drive pulse train for feeding a drive current to the coil; and a controller responsive to interruption of the output of the comparator for interrupting generation of the drive pulse train of the pulse generator. The permanent magnet is detected and driven by the single coil so that the output may be generated by the comparator when the induced voltage of the coil exceeds the reference value, and the drive pulse train is generated during generation of that output to feed the drive current to the coil. The coil can always be efficiently driven at the maximal point of the induced voltage, and the permanent magnet can be driven with a stable amplitude. The amplitude can be easily adjusted merely by changing the reference voltage.

8 Claims, 4 Drawing Sheets

ELECTROMAGNETIC DRIVE CIRCUIT

BACKGROUND OF THE INVENTION

1. Field of the Invention

The present invention relates to an electromagnetic circuit to be used for driving a pendulum or the like.

2. Description of the Prior Art

A drive circuit for detecting and driving the pendulum of a clock with one coil is shown, for example, in FIG. 4. The operations of this drive circuit will be described in the following. As the permanent magnet M of a pendulum approaches a coil $L_2$, as shown in FIG. 5A, this coil $L_2$ induces a voltage $V_1$ (as shown in FIG. 6A) in a direction to repulse the magnet M. When the coil $L_2$ comes to face the magnet M, as shown in FIG. 5B, it induces no voltage. As the coil $L_2$ leaves the magnet M, as shown in FIG. 5C, it induces a voltage $V_2$ (as shown in FIG. 6A) in a direction to attract the magnet M.

The voltages thus induced are generated at a terminal P of FIG. 4. If the induced voltage exceeds a reference voltage $v_r$, a transistor $T_2$ is turned off whereas a transistor $T_1$ is turned on so that a drive current flows in the coil $L_2$. The ON time $t_4$ of this transistor $T_1$ is determined by a capacitor C and a resistor $R_1$.

In order to drive the magnet M efficiently, it is preferable in the case of attraction drive that the magnet M be driven at the timing of FIG. 5A, i.e., at the maximal point of the induced voltage $V_1$, as shown in FIG. 6A. In order to satisfy this condition, therefore, the reference voltage $v_r$ and the drive time $t_4$ are properly set.

In case the pendulum is to be driven, the drive timing and time are ordinarily different depending upon the length of the pendulum rod or the magnitude of its swing angle.

In the circuit described above, however, the drive time is uniquely determined by the time constant which in turn is determined by the capacitor C and the resistor $R_1$. This makes it necessary to adjust the time constant each time in accordance with the length or swing angle of the pendulum rod.

In order to change the drive timing, on the other hand, the reference voltage $v_r$ has to be properly adjusted.

For example, if the swing angle is to be reduced by using the same pendulum as that of the case of FIG. 6A, the induced voltage has a reduced amplitude and a gentle change. In this case, the reference voltage $v_r$ has to be regulated to adjust the drive timing. Moreover, the drive current has to be fed to the coil for a longer time $t_5$ than the aforementioned one at the maximal point of the induced voltage. For this necessity, the time constant of the capacitor C and the resistor $R_1$ has to be changed.

If, in this case, the drive time is set at a larger value than that of the optimum value $t_4$, as indicated by broken curves in FIG. 6A, for example, the swing angle grows more than necessary, and the drive current will flow, too, at the generation timing of the induced voltage $V_2$ of opposite polarity so that it is wasted.

If, on the other hand, the drive time is set in the case of FIG. 6B at a smaller value than the optimum value $t_5$, as indicated by broken curves, a necessary drive power may fail to be established to stop the pendulum.

Similar adjustments are also required in case the pendulum rod has a different length, followed by similar defects.

Thus, in the circuit of the prior art, both the time constant of the circuit and the reference voltage have to be adjusted each time in accordance with the magnitude of the swing angle and the length of the pendulum rod. If, moreover, these adjustments are mistaken, the resultant defects are the waste consumption of the current and the stop of the pendulum.

A detailed description of the prior art circuit constitution is given above, but the biggest defect thereof is the incapability of integrating the circuit constitution.

SUMMARY OF THE INVENTION

It is a primary object of the present invention to provide an electromagnetic driving circuit in which a circuit constitution except a coil can be integrated.

It is, therefore, an object of the present invention to provide such an electromagnetic drive circuit for detecting and driving a permanent magnet with a single coil as can accomplish the drive efficiently without any waste of current consumption to stabilize a desired amplitude and can optimize the drive automatically even in case of a different swing period.

According to a major feature of the present invention, there is provided an electromagnetic drive circuit comprising: a coil for detecting and driving a permanent magnet; a comparator for generating an output when the induced voltage of said coil exceeds a reference voltage; a pulse generator for generating a drive pulse train in response to generation of the output of said comparator; a driver responsive to said drive pulse train for feeding a drive current to said coil; and a controller responsive to interruption of the output of said comparator for interrupting generation of the drive pulse train of said pulse generator.

According to another feature of the present invention, there is provided an electromagnetic drive circuit comprising: a coil for detecting and driving a permanent magnet; a comparator for generating an output when the induced voltage of said coil exceeds a reference voltage; a pulse generator for generating a drive pulse train in response to generation of the output of said comparator; a driver responsive to said drive pulse train for feeding a drive current to said coil; a changeover switch for changing over the reference voltage of said comparator after the generation of said drive pulse train has been started; and a controller responsive to interruption of the output of said comparator for interrupting generation of the drive pulse train of said pulse generator.

In short, the electromagnetic drive circuit according to the present invention is provided with a comparator for generating an output when the induced voltage of a coil for detecting and driving a permanent magnet exceeds a reference voltage. Also provided is a pulse generator for generating a drive pulse train in response to generation of the output of the comparator. A drive current is fed to the coil in response to the drive pulse train, which in turn is interrupted in response to interruption of the output of the comparator. The reference voltage upon the drive interruption is made different from that of the drive start to effect a more proper drive.

BRIEF DESCRIPTION OF THE DRAWINGS

Other objects, features and advantages of the present invention will become apparent from the following description taken with reference to the accompanying drawings, in which.

DESCRIPTION OF THE PREFERRED EMBODIMENT

The present invention will be described in the following in connection with the embodiments thereof with reference to the accompanying drawings.

Figure 1:
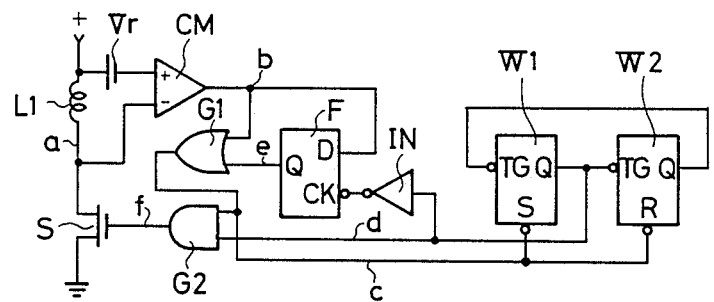
FIG. 1 is a diagram showing a logic circuit according to one embodiment of the present invention.

In FIG. 1, letters $V_r$ designate a reference voltage source which is set at a reference voltage $v_r$ of FIG. 2a. Letters CM designate a comparator for generating an output when the induced voltage of a coil $L_1$ exceeds the reference voltage $v_r$. Letters $G_1$ and $G_2$ designate gates, and letter F designates a flip-flop constituting a controller together with the gates $G_1$ and $G_2$. Letters $W_1$ and $W_2$ designate one-shot pulse generators constituting a pulse generator together with the gate G2. These one-shot pulse generators $W_1$ and $W_2$ are set to have output pulse widths $t_1$ and $t_2$, respectively. Letters IN designates an inverter, and letter S designate a transistor constituting a driver.

Figure 2:
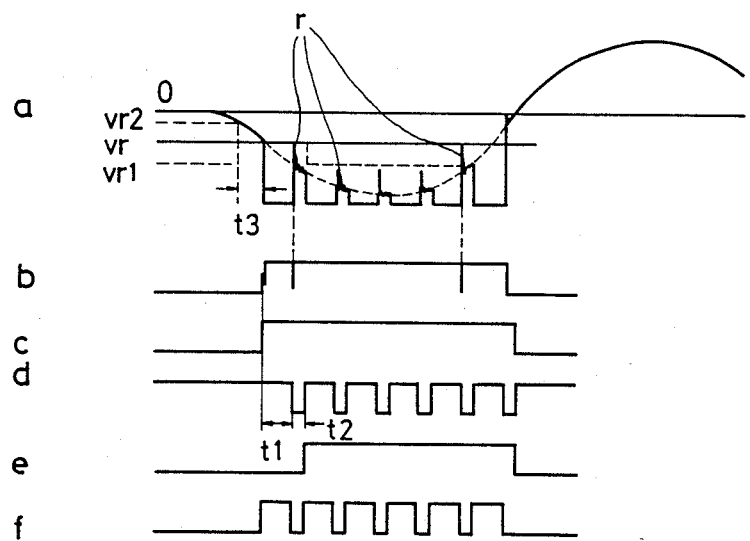
FIGS. 2 and 3 are voltage waveform charts for explaining the operations of the logic circuit of FIG. 1.

The operations of the electromagnetic driving circuit thus constructed will be described in the following with reference to FIG. 2. While no output is being generated by the comparator CM, the one-shot pulse generators $W_1$ and $W_2$ are set and reset, respectively, by the output of the gate $G_1$.

When, in this state, the induced voltage of the coil $L_1$ exceeds the reference voltage $v_r$, as shown in FIG. 2a, the comparator CM generates its output, as shown in FIG. 2b, to release the one-shot pulse generators $W_1$ and $W_2$ from their respective set and reset states through the gate $G_1$. As a result, the output of the one-shot pulse generator $W_1$ is inverted to "0" after lapse of the time $t_1$, as shown in FIG. 2d, so that the one-shot pulse generator $W_2$ is triggered to generate a pulse train having the width of the time $t_2$ from its output. Thus, the one-shot pulse generators $W_1$ and $W_2$ act together so that a drive pulse train of FIG. 2d is generated from the output of the one-shot pulse generator $W_1$. By the rise of the first pulse of this drive pulse train is triggered the flip-flop F, the output Q of which is held at "1", as shown in FIG. 2e. As a result, the output of the gate $G_1$ is held at "1" on and after the output generation of the comparator CM, as shown in FIG. 2c, and the drive pulse train is generated through the gate $G_2$, as shown in FIG. 2f. The transistor S is turned on by this drive pulse train so that the drive current flows in the coil $L_1$.

That drive pulse train is fed to the clock input of the flip-flop F so that the output state of the comparator CM is judged in terms of the rise of the drive pulse train. As a result, this drive pulse train is being generated, while the comparator CM is generating its output, to drive the coil $L_1$.

When, on the contrary, the aforementioned induced voltage drops below the reference voltage $v_r$ so that the comparator CM interrupts generation of its output, the output of the flip-flop F is inverted to "0" by the first rise of the drive pulses that will occur after the interruption. Then, the drive pulse train and accordingly the drive of the coil $L_1$ are interrupted.

Figure 3:
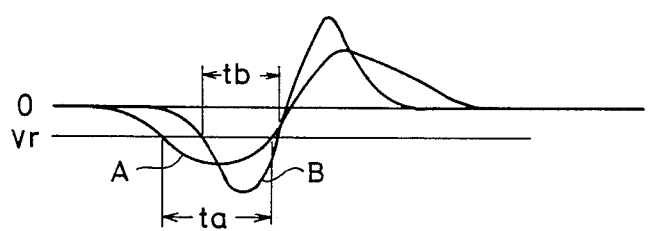
Figure 4:
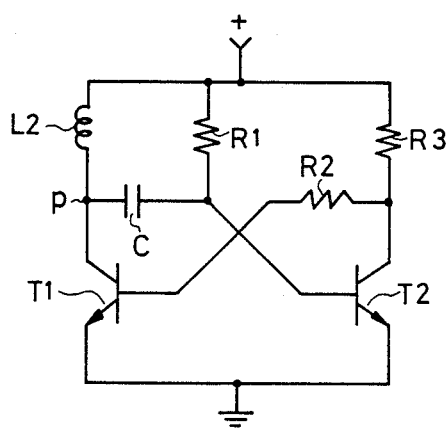
FIG. 4 is an electric circuit diagram showing one example of the electromagnetic drive circuit of the prior art.
Figure 5:
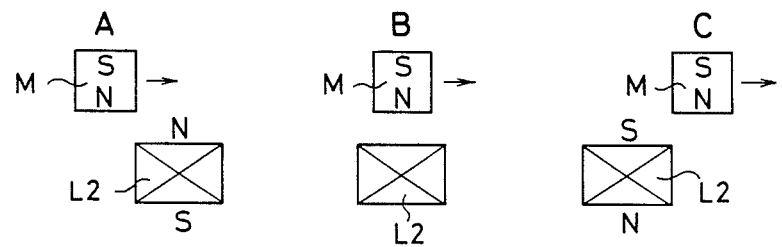
FIG. 5 is a diagram for explaining the positional relationships between the permanent magnet and the coil.
Figure 6:
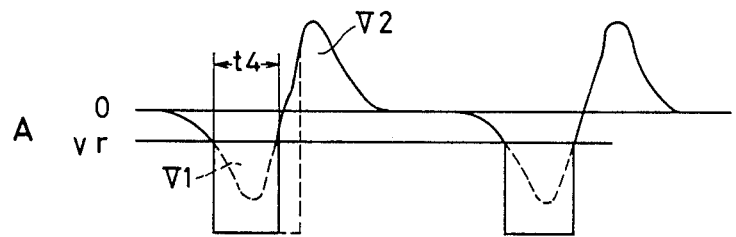
FIG. 6 is a voltage waveform chart for explaining the operations of the electromagnetic drive circuit of FIG. 4.
Figure 6:
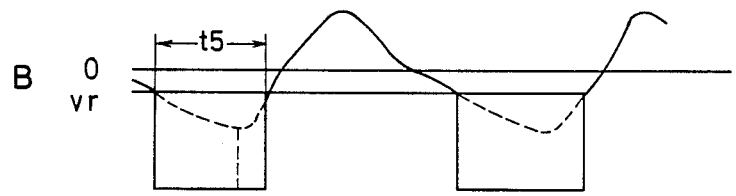

As has been described above, the drive current will be flowing in the coil while the induced voltage exceeds the reference voltage $v_r$. As a result, the drive can be efficiently accomplished at the maximal point of the induced voltage at all times and be stabilized at a constant swing angle. More specifically, the curve of the induced voltage is gentle for a small swing angle so that the drive time $t_a$ is elongated, as indicated at A in FIG. 3, but becomes steep for a larger swing angle, as shown at B in FIG. 3, so that the drive time $t_b$ is shortened. In this way, an automatic control is achieved to stabilize the swing angle at the constant value.

For a pendulum having a different swing period (or a swinging rod of different length), moreover, an optimum drive can be automatically accomplished.

Incidentally, the output width $t_2$ of the one-shot pulse generator $W_2$ is set, as follows, although having been omitted in the foregoing description. Since the coil $L_1$ is driven by the drive pulse train, a ringing r will usually occur for 1 ms, as shown in FIG. 2a, when the pulse train is interrupted. Since the induced voltage of the coil $L_1$ is unstable during that ringing, a malfunction may occur if a subsequent drive pulse is generated during that ringing so that the output of the comparator CM is judged by the flip-flop F. Therefore, in order that the subsequent drive pulse may not be generated before the induced voltage is stabilized, the output width $t_2$ of the one-shot pulse generator $W_2$ is set at several milliseconds.

Incidentally, in case the coil is to be driven, energization of a permanent magnet is not adversely affected but can be ignored even in the presence of a drive stop time of several milliseconds.

Figure 1A:
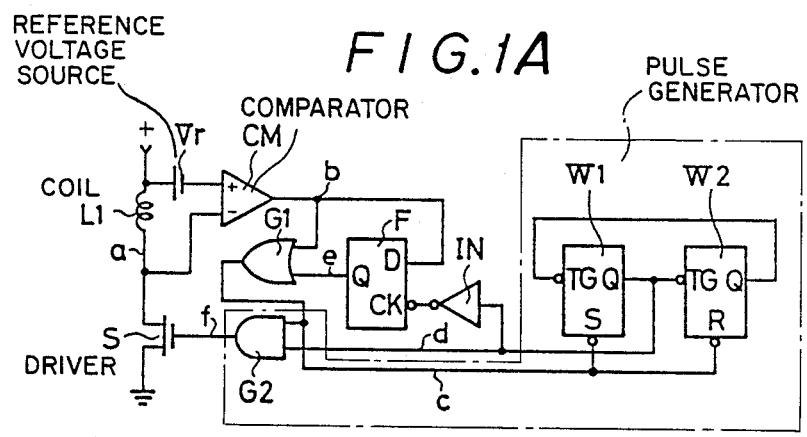
FIG. 1(A) is the diagram of FIG. 1 with the addition of descriptive terms indicating which circuit elements perform certain circuit functions.
Figure 1B:
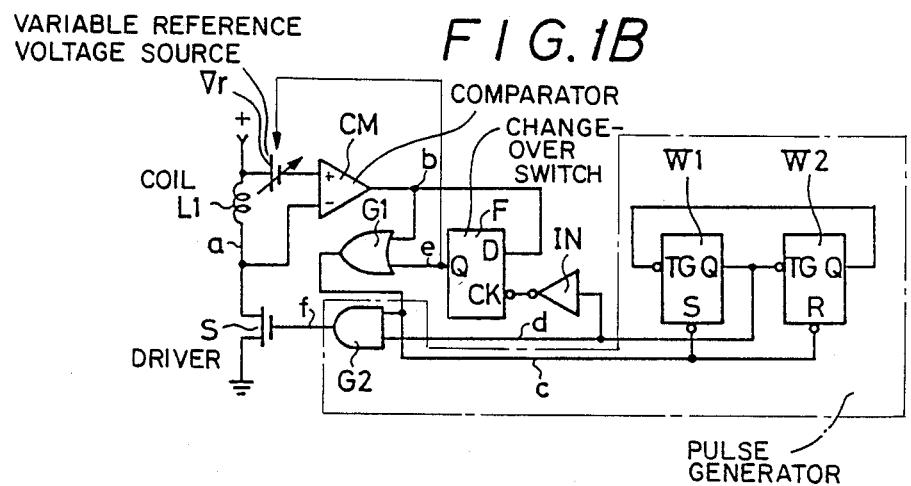
FIG. 1(B) is the diagram of FIG. 1(A) indicating a variable reference voltage source in place of the reference voltage source Vr of FIG. 1(A)

In the embodiment thus far described, the reference voltages for determining the drive starting timing and the drive interrupting timing are set at the common value $v_r$. However, the two timings may be made different to adjust the drive ending timing. For example, the drive pulse train can be generated by using a reference voltage source of voltage-variable type and by changing over the voltage to a value $v_{r1}$, as shown in FIG. 1(B) and in FIG. 2a, with the output of the flip-flop F. A finer adjustment of the drive time can be achieved.

Generally speaking, the amplitude of the induced voltage is influenced by the fluctuations of the supply voltage. Any fluctuations of the amplitude of the induced voltage will result in that the timing, at which the reference voltage is exceeded, is shifted to cause fluctuations of the drive timing and time period. In order to reduce the influences of the fluctuations of the power supply, therefore, the reference voltage $v_r$ may be set at such a relatively low value as to receive little influence from the fluctuations of the power supply so that the output of the comparator may be delayed a constant time by a delay circuit to start the drive from the delayed instant. As shown in FIG. 2a, for example, the reference voltage is set at a lower value $v_{r2}$ so that the output, which is generated by the comparator when the induced voltage exceeds the voltage $v_{r2}$, may be delayed by the delay circuit (although not shown) and fed with a delay time $t_3$ to the flip-flop F and the gate $G_1$. Thus, it is possible to reduce the influences coming from the fluctuations of the voltage of the power supply and to drive the coil at the optimum timing and for the optimum drive time.

According to the present invention, the permanent magnet is detected and driven by the single coil so that the output may be generated by the comparator when the induced voltage of the coil exceeds the reference value, and the drive pulse train is generated during generation of that output to feed the drive current to the coil. As a result, the circuit constitution except the coil can be integrated. And the coil can always be efficiently driven at the maximal point of the induced voltage, and the permanent magnet can be driven with the stable amplitude. In other words, the driving force is increased for a smaller swing angle whereas the drive time is shortened for a larger swing angle so that the automatic control acts to stabilize the swing angle to the constant value. Moreover, the amplitude can be easily adjusted merely by changing over the reference voltage.

Still moreover, a pendulum having a different intrinsic period can be automatically driven at the optimum timing and for the optimum drive time.

By changing over the reference voltage after generation of the output of the comparator, furthermore, the timing of the drive interruption can be adjusted to refine the control of the drive time.

What is claimed is:

1. An electromagnetic circuit comprising: a coil for detecting and driving a permanent magnet; a reference voltage source for generating a reference voltage; a comparator responsive to voltage induced in said coil by the magnet and to said reference voltage to generate an output signal when induced voltage of said coil exceeds said reference voltage; means for generating a drive pulse train for feeding said coil in response to said output signal from said comparator and means for stopping said drive pulse train when induced voltage in said coil no longer exceeds said reference voltage.

2. An electromagnetic drive circuit according to claim 1, further comprising a change-over switch for changing over the reference voltage after the generation of said drive pulse train has been started.

3. An electromagnetic drive circuit according to claim 1, wherein said stopping means includes two gates and a flip-flop.

4. An electromagnetic drive circuit according to claim 1, wherein said pulse generator includes two one-shot generating means.

5. An electromagnetic drive circuit according to claim 1, further comprising a transistor for driving said coil with said drive pulse train.

6. An electromagnetic drive circuit comprising: a coil for detecting and driving a permanent magnet; a variable reference voltage source for generating a reference voltage; a comparator for generating an output signal when induced voltage of said coil exceeds said reference voltage; a pulse generator for generating a drive pulse train in response to said output signal from said comparator and for stopping said drive pulse train in response to disappearance of said output signal; and a change-over switch for varying the reference voltage of said variable reference voltage source after the generation of said drive pulse train has been started.

7. A method for correcting the motion of a pendulum, comprising the steps of:
   inducing voltage in an electromagnetic coil representative of the motion of the pendulum;
   comparing said induced voltage with a predetermined reference voltage;
   generating an output signal when said induced voltage exceeds said reference voltage;
   generating a drive current responsive to the presence of said output signal;
   driving said electromagnetic coil with said drive current; and
   interrupting said drive current when said induced voltage no longer exceeds said reference voltage.

8. The drive circuit of claim 1 in which said generating means is responsive to the presence of said output signal from said comparator.

* * * * *